US012810148B2

(12) United States Patent
Toroman et al.

(10) Patent No.: US 12,810,148 B2
(45) Date of Patent: Nov. 24, 2026

(54) SCALABLE, MULTI-MODAL, MULTIVARIATE DEEP LEARNING PREDICTOR FOR TIME SERIES DATA

(71) Applicant: Falkonry Inc., Cupertino, CA (US)

(72) Inventors: Vukasin Toroman, Karlsruhe (DE); Daniel Kearns, Half Moon Bay, CA (US); Joseph Porter, Nolensville, TN (US); Charu Singh, Santa Clara, CA (US); Nikunj Mehta, Cupertino, CA (US)

(73) Assignee: Falkonry Inc., Cupertino, CA (US)

( * ) Notice: Subject to any disclaimer, the term of this patent is extended or adjusted under 35 U.S.C. 154(b) by 768 days.

(21) Appl. No.: 17/956,827

(22) Filed: Sep. 30, 2022

(65) Prior Publication Data

US 2024/0112016 A1 Apr. 4, 2024

(51) Int. Cl.
*G06N 3/08* (2023.01)

(52) U.S. Cl.
CPC .................................... *G06N 3/08* (2013.01)

(58) Field of Classification Search
CPC ........................................................ G06N 3/08
See application file for complete search history.

(56) References Cited

U.S. PATENT DOCUMENTS 6,717,576 B1 4/2004 Hong et al.
7,385,608 B1 6/2008 Baldwin
7,697,816 B2 4/2010 Takada et al.
10,902,062 B1 1/2021 Guha et al.
10,997,137 B1 5/2021 Goyal et al.
11,080,127 B1 8/2021 Vincent et al.
(Continued)

FOREIGN PATENT DOCUMENTS

CN 109710636 B 10/2022
KR 102482240 B1 12/2022
(Continued)

OTHER PUBLICATIONS

Wang et al., Variational Transformer-Based Anomaly Detection Approach for Multivariate Time Series, Jan. 2022. (Year: 2022).*
(Continued)

*Primary Examiner* — Marshall L Werner
(74) *Attorney, Agent, or Firm* — Duane Morris LLP

(57) ABSTRACT

A computer system for managing a machine learning model that detects potential anomalies in the operation of a complex system is disclosed. In some embodiments, the computer system is programmed to receive sensor signal data originally produced by sensors of the complex system. The sensor signal data can include values for multiple sensor signals at multiple resolutions. The computer system is programmed to train, from given sensor signal data, the machine learning model that comprises one or more transformers, each transformer capturing a set of relationships between signals in a predetermined group of signals. During training, the computer system is programmed to also establish an expected range for an indicator of the relationship. The computer system is programmed to then execute the machine learning model on new sensor signal data and take remedial steps when any computed indicator falls outside the expected range, indicating a potential anomaly in the operation of the complex system.

19 Claims, 5 Drawing Sheets

(56) References Cited

U.S. PATENT DOCUMENTS

| | | | |
|---|---|---|---|
| 11,366,801 | B1 | 6/2022 | Kumar et al. |
| 11,409,771 | B1 | 8/2022 | Goyal et al. |
| 11,461,347 | B1 | 10/2022 | Das et al. |
| 11,513,854 | B1 | 11/2022 | Saxena et al. |
| 11,599,516 | B1 | 3/2023 | Sorenson et al. |
| 11,797,836 | B1 | 10/2023 | Evans |
| 11,841,699 | B2 | 12/2023 | Sayyarrodsari et al. |
| 2008/0235365 | A1 | 9/2008 | Bansal et al. |
| 2012/0007868 | A1 | 1/2012 | Buck |
| 2012/0278663 | A1 | 11/2012 | Hasegawa |
| 2013/0262035 | A1 | 10/2013 | Mills |
| 2013/0318011 | A1 | 11/2013 | Jones et al. |
| 2014/0136107 | A1 | 5/2014 | Pfeifle |
| 2015/0033086 | A1 | 1/2015 | Sasturkar et al. |
| 2015/0169393 | A1 | 6/2015 | Shibuya |
| 2015/0222495 | A1 | 8/2015 | Mehta et al. |
| 2016/0004585 | A1 | 1/2016 | Slama et al. |
| 2016/0080438 | A1 | 3/2016 | Liang |
| 2016/0203176 | A1 | 7/2016 | Mills |
| 2017/0199047 | A1 | 7/2017 | Stankoulov |
| 2017/0206464 | A1 | 7/2017 | Clayton et al. |
| 2017/0228460 | A1 | 8/2017 | Amel et al. |
| 2017/0255709 | A1 | 9/2017 | Cho et al. |
| 2017/0308802 | A1 | 10/2017 | Ramsøy et al. |
| 2017/0317874 | A1 | 11/2017 | Borah |
| 2018/0032312 | A1 | 2/2018 | Hansen et al. |
| 2018/0039555 | A1 | 2/2018 | Salunke et al. |
| 2018/0053109 | A1 | 2/2018 | Caffrey |
| 2018/0060155 | A1 | 3/2018 | Tran Van |
| 2019/0095508 | A1 | 3/2019 | Porath et al. |
| 2019/0147300 | A1 | 5/2019 | Bathen et al. |
| 2019/0188065 | A1 | 6/2019 | Anghel et al. |
| 2019/0258677 | A1 | 8/2019 | Beedgen et al. |
| 2020/0012657 | A1 | 1/2020 | Walters et al. |
| 2020/0050182 | A1* | 2/2020 | Cheng ...................... G06N 3/08 |
| 2020/0064822 | A1 | 2/2020 | Song et al. |
| 2020/0073740 | A1 | 3/2020 | Ohana et al. |
| 2020/0082013 | A1 | 3/2020 | Triplet et al. |
| 2020/0097351 | A1 | 3/2020 | Raghavan et al. |
| 2020/0134441 | A1 | 4/2020 | Suthar et al. |
| 2020/0167355 | A1 | 5/2020 | Rath et al. |
| 2020/0167652 | A1 | 5/2020 | Huang et al. |
| 2020/0226490 | A1 | 7/2020 | Abdulaal |
| 2020/0234474 | A1 | 7/2020 | Mittelstdt |
| 2020/0292608 | A1 | 9/2020 | Yan et al. |
| 2020/0334254 | A1 | 10/2020 | Arye et al. |
| 2020/0348662 | A1 | 11/2020 | Cella et al. |
| 2020/0379454 | A1 | 12/2020 | Trinh et al. |
| 2021/0026747 | A1 | 1/2021 | Garion et al. |
| 2021/0035266 | A1 | 2/2021 | Toroman et al. |
| 2021/0042605 | A1* | 2/2021 | Song ..................... G06F 18/214 |
| 2021/0056430 | A1 | 2/2021 | Wu et al. |
| 2021/0117268 | A1 | 4/2021 | Koeberl et al. |
| 2021/0124983 | A1 | 4/2021 | Axenie et al. |
| 2021/0125387 | A1 | 4/2021 | Kawata et al. |
| 2021/0149384 | A1 | 5/2021 | Dittmer et al. |
| 2021/0157312 | A1 | 5/2021 | Cella et al. |
| 2021/0247754 | A1 | 8/2021 | Takahashi et al. |
| 2021/0248447 | A1 | 8/2021 | Rickard et al. |
| 2022/0012538 | A1 | 1/2022 | Mizoguchi et al. |
| 2022/0180189 | A1* | 6/2022 | Adrian ................. G06N 3/0464 |
| 2022/0180478 | A1 | 6/2022 | Toroman et al. |
| 2022/0195861 | A1 | 6/2022 | Patino Virano et al. |
| 2022/0198264 | A1 | 6/2022 | Guo et al. |
| 2022/0237102 | A1 | 7/2022 | Bugdayci et al. |
| 2022/0314434 | A1* | 10/2022 | Kranski ................... B25J 9/163 |
| 2022/0318678 | A1* | 10/2022 | Kranski ................. G06N 20/00 |
| 2023/0061808 | A1 | 3/2023 | Gillian |
| 2023/0085991 | A1 | 3/2023 | Liebman |
| 2023/0091197 | A1 | 3/2023 | Edwards et al. |
| 2024/0428051 | A1* | 12/2024 | Xian ...................... B25J 9/1628 |

FOREIGN PATENT DOCUMENTS

| | | | |
|---|---|---|---|
| TW | 202141212 | A | 11/2021 |
| WO | 2023059432 | A1 | 4/2023 |

OTHER PUBLICATIONS

Chen et al., Learning Graph Structures with Transformer for Multivariate Time Series Anomaly Detection in IoT, Jan. 2022. (Year: 2022).*

Qi et al., MAD-SGCN: Multivariate Anomaly Detection with Self-Learning Graph Convolutional Networks, May 2022. (Year: 2022).*

Deng et al., Graph Neural Network-Based Anomaly Detection in Multivariate Time Series, Jun. 2021. (Year: 2021).*

Vaswani et al., Ashish, "Attention Is All You Need", 31st Conference on Neural Information Processing Systems (NIPS 2017), Dec. 6, 2017, pp. 1-15.

Devlin, Jacob et al., "BERT: Pre-training of Deep Bidirectional Transformers for Language Understanding", arXiv:1810.04805v2 [cs.CL], May 24, 2019, 16 pages.

Patil, Sangram, et al. "Ensembles of Ensemble Machine Learning Approach for Fault Detection of Bearing." Solid State Technology, vol. 63, (Year: 2020).

Chen, Lioun Wee. "A Hierarchical Decision Process for Fault Administration." ProQuest Dissertations & Theses, 1991. Print. (Year: 1991).

Madani, Seyed Sohail, et al. "Islanding Detection for PV and DFIG Using Decision Tree and Ada Boost Algorithm." IEEE PES Innovative Smart Grid Technologies Conference Europe (ISGT Europe) (Year: 2012).

International Search Report and Written Opinion for Application No. PCT/US2023/075303, Mailed Feb. 2, 2024, 15 pages.

Zekai Chen et al: "Learning. Graph Structures .with Transformer for Multivariate Time Series Anomaly Detection in IoT", arxiv.org, Cornell University Library, 201 Olin Library Cornell University Ithaca, NY 14853, Jan. 17, 2022, 12 pages.

Devlin, Jacob et al., "BERT: Pre-training of Deep Bidirectional Transformers for Language Understanding", May 24, 2019, 16 pages.

The International Searching Authority, "Search Report" in application No. PCT/US2020/043735, dated Oct. 9, 2020, 15 pages.

Jugel et al, "M4 Visualization-Oriented Time Series Data Aggregation", dated Jun. 30, 2014, pp. 797-808.

Current Claims in application No. PCT/US2020/043735, dated Oct. 2020, 4 pages.

Battle et al., "Dynamic Prefetching of Data Tiles or Interactive Visualization", dated Jun. 30, 2016, SIGfVIOD Proceedings of the 2016 International Conference on Management of Data, pp. 1363-1375.

International Search Report and Written Opinion for Application No. PCT/US2023/078115, Mailed Mar. 1, 2024, 13 pages.

Non-Final Office Action, Aug. 1, 2023.

Final Office Action, Dec. 11, 2023.

Notice of Allowance, Feb. 28, 2024.

U.S. Appl. No. 16/939,568, filed Jul. 27, 2020.

U.S. Appl. No. 17/459,085, filed Aug. 27, 2021.

U.S. Appl. No. 17/493,800, filed Oct. 4, 2021.

U.S. Appl. No. 17/681,052, filed Feb. 25, 2022.

U.S. Appl. No. 17/976,575, filed Oct. 28, 2022.

U.S. Appl. No. 18/520,488, filed Nov. 27, 2023.

U.S. Appl. No. 17/976,575, Notice of Allowance, Jan. 2, 2025.

U.S. Appl. No. 17/459,085, Non-Final Office Action, Nov. 6, 2024.

U.S. Appl. No. 17/976,575, Final Office Action, Sep. 9, 2024.

U.S. Appl. No. 18/520,448, Non-Final Office Action, Jul. 18, 2025.

U.S. Appl. No. 17/459,085, Non-Final Office Action, Feb. 11, 2025.

* cited by examiner

SCALABLE, MULTI-MODAL, MULTIVARIATE DEEP LEARNING PREDICTOR FOR TIME SERIES DATA

RELATED APPLICATIONS

This application is related to U.S. patent application Ser. No. 17/493,800 filed on Oct. 24, 2021, the entire contents of which are incorporated by reference in its entirety as if fully disclosed herein.

TECHNICAL FIELD

The present application relates to processing of time series data and management of complex physical systems, and, more particularly to, multivariate deep learning to detect occurrences of anomalous conditions of complex systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Monitoring modern complex physical systems ("complex systems" or "physical systems"), such as industrial machines, distributed application servers, computer networks, human bodies, and vehicular and human traffic systems, require managing numerous sensors or data collectors. These sensors produce sensor signals that over time form large amounts of time series data, which can lead to tremendous processing and storage overhead. It would be helpful to effectively process and analyze the time series data, to enable timely detection of potential anomalies in the operation of the complex systems.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENTS

Figure 1:
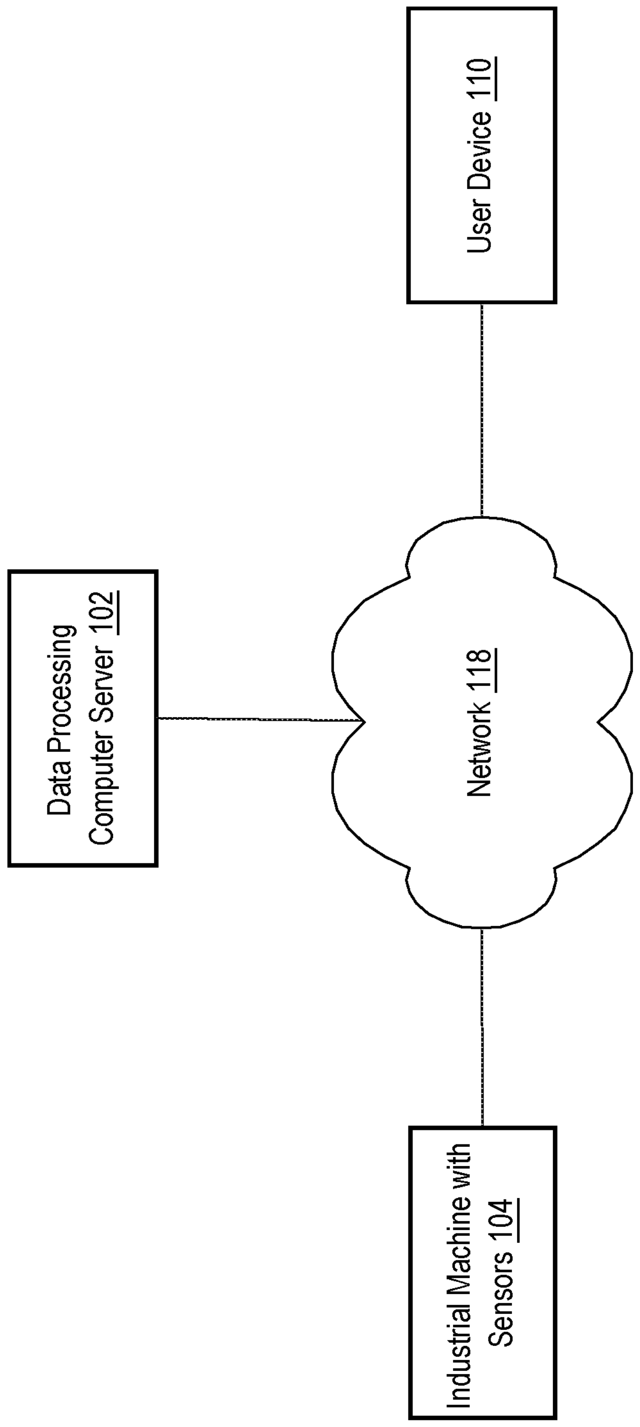
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:

1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. DATA COLLECTION AND REPRESENTATION
   4.2. MACHINE LEARNING MODEL
   4.3. SENSOR SIGNAL SELECTION
   4.4. MODEL TRAINING
   4.5. MODEL EXECUTION
5. EXAMPLE PROCESSES
6. HARDWARE IMPLEMENTATION
7. EXTENSIONS AND ALTERNATIVES

1. General Overview

A computer system for managing a machine learning model that detects potential anomalies in the operation of a complex system is disclosed. In some embodiments, the computer system is programmed to receive sensor signal data originally produced by sensors of the complex system. The sensor signal data can include values for multiple sensor signals at multiple resolutions. The computer system is programmed to train, from given sensor signal data, the machine learning model that comprises one or more transformers, each transformer capturing a set of relationships between signals in a predetermined group of signals. During training, the computer system is programmed to also establish an expected range for an indicator of the relationship. The computer system is programmed to then execute the machine learning model on new sensor signal data and take remedial steps when any computed indicator falls outside the expected range, indicating a potential anomaly in the operation of the complex system.

In some embodiments, the computer system is programmed to receive sensor signal data. The sensor signal data can be in the form of embeddings that constitute a more concise representation of tiles or slices thereof. Each tile is further a more concise representation of raw time series generated by sensors and has a fixed size as the unit of electronic transmission. The condition of the complex system during a specific time interval is represented by a plurality of embeddings respectively for a plurality of sensor signals. Each embedding could comprise one or more resolutions or scales covering the specific time interval.

In some embodiments, the computer system is programmed to train a machine learning model that represents at least a normal condition of the complex system, on given signal sensor data generated when the complex system operates normally. The machine learning model comprises one or more sub-models, each capturing one or more relationships between a selected sensor signal and the rest of the sensor signals. Each sub-model can be a transformer, with one or more encoders and one decoder. Each encoder can have a multi-head self-attention mechanism that automatically weights different embeddings for the non-selected sensor signals. The decoder then predicts the embedding for the selected sensor signal from the weighted embeddings for the non-selected sensor signals, and the difference between the predicted embedding and the actual embedding can be recorded or analyzed. Specifically, during model training, the computer system can be programmed to create an expected range for the difference between the predicted embedding and the actual embedding for each selected sensor signal, and during model execution, the computer system can be programmed to compare the difference with the associated expected range. A deviation from the expected range for at least one sensor signal could be an indication of a potential anomaly in the operation of the industrial machine.

For example, there can be a total of three sensors respectively for temperature, pressure, and rotational speed. The machine learning model can thus have up to three transformers, each of which could train on a single selected signal or incorporate multiple selected signals. For one training round of a transformer, the selected sensor signal can correspond to temperature. The input data for training a transformer can comprise embeddings for all three sensor signals during a common time interval. The transformer would weight the sensor signal data for the non-selected sensor signal, namely the embeddings for pressure and rotational speed, and use the weighted sensor signal data to predict or reproduce the sensor signal data for the selected sensor signal, namely the embedding for temperature. The machine learning model could similarly have two other transformers, one with the sensor signal for pressure as the selected sensor signal, and the other with the sensor signal for rotational speed as the selected sensor signal. The machine learning model could also have a single transformer that encodes the relationship among all three signals for a reduced model size. The difference between the predicted embedding and the actual embedding for temperature can be analyzed.

In some embodiments, when the difference deviates from the associated expected range for any selected sensor signal, the computer system is programmed to take further corrective actions. The corrective actions can include sending a report indicating relevant information regarding a potential anomaly. In the example above, when the selected sensor signal is for temperature, the relevant information can include the common time interval, the mean value of the sensor signal for temperature at different resolutions, the amount of deviation of the difference between predicted embedding and the actual embedding from the associated expected range, or a set of instructions for how to further investigate the potential anomaly. The corrective actions can also include sending a command signal to directly control the operation of one or more components of the complex system.

The computer system has several technical benefits. In terms of the sensor signal data, transforming raw time series into tiles enables efficient transfer of sensor signal data due to the fixed size of each tile. The tile can be transferred on demand and in real time. Transforming the tiles or slices thereof into embeddings reduces the amount of data that needs to be processed by the machine learning model, leading to efficient training and execution of the machine learning model. Sensor signal data corresponding to normal conditions of the complex system alone can be used for training the machine learning model, reducing the difficulty in gathering sufficient training data and the size of the machine learning model to be trained. The multiple resolutions of the sensor signal data provide rich context information for the operation of the complex system and help increase the accuracy of the machine learning model.

In terms of the machine learning model, the self-attention aspect helps home in on the precise relationship between a selected sensor signal and the other sensor signals and give more weight to portions of the sensor signal data for the other sensor signals that may be more related to the selected sensor signal. The multi-head aspect enables the processing of a relatively large number of sensor signals through parallelism. The structure of the machine learning model with multiple, independent transformers provides further room for parallelism, which can be executed on graphics processing units (GPUs) or other hardware optimized for parallel processing. When sensor signal data for different resolutions are analyzed by different transformers, even further parallelism can be achieved.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a data processing computer server 102 ("server"), an industrial machine with sensors 104, and a user device 110, which are communicatively coupled through direct physical connections or via one or more networks 118.

In some embodiments, the server 102 broadly represents one or more computers hosting virtual computing instances, and/or instances of an application that is programmed or configured with data structures and/or database records that are arranged to host or execute functions related to processing and analyzing sensor signal data produced by the industrial machine with sensors 104 to evaluate the current condition of the industrial machine. The server 102 can be configured to train a machine learning model that learns relationships among the sensor signals from given sensor signal data. The server 102 can be configured to further execute the machine learning model on new sensor signal data and take remedial actions upon detecting potential anomalies in the operation of the industrial machine. The server 102 can comprise a server farm, a cloud computing platform, a parallel computer, a computer with one or more central processing units (CPUs) and one or more GPUs, or any other computing facility with sufficient computing power in data processing, data storage, and network communication for the above-described functions.

In some embodiments, the industrial machine with sensors 104 or the sensors alone can measure various attributes of the industrial machine in operation, such as temperature, pressure, noise, density, speed, position, or orientation. The industrial machine may have various components, and multiple sensors can measure the same attributes of different components of the industrial machine. Typically, each sensor generates measurements at a particular frequency, forming a sensor signal of time series data. The set of all sensor signal values in a time interval represents the state of the industrial machine in that time interval. The industrial machine or at least one of the sensors can incorporate one or more processors capable of transmitting the sensor signal data to the server 102 or another remote device or relaying commands from the server 102 to control the operation of different components of the industrial machine.

In some embodiments, the user device 110 represents a user of the industrial system with sensors 108 and/or a user of the server 102. The user device 110 can provide configuration data for training and executing the machine learning model, such as the amount of data to process in each execution of the machine learning model or the number of neural network layers in the machine learning model. The user device can also receive output data of the machine learning model, such as a notification of a potential anomaly in the operation of the industrial machine or an instruction on how to handle the potential anomaly. Each of the one or more user devices 110 can comprise a desktop computer, laptop computer, tablet computer, smartphone, or wearable device. In certain embodiments, the server 102 can be integrated into the user device 110.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive raw time series data from the industrial machine with sensors 104, continuously in real time. The server 102 can be programmed to transform the raw time series data into embeddings as a more concise representation or rely on another system to do so. The server 102 can be programmed to receive configuration data for training a machine learning model to detect potential anomalies in the operation of the industrial machine. The server 102 can be programmed to use given embeddings for the sensor signals to train the machine learning model based on the configuration data and subsequently execute the machine learning model on new embeddings to evaluate the current condition of the industrial machine. The server 102 can be programmed to take corrective actions in response to detecting potential anomalies, such as sending a report of a potential anomaly to the user device 110 or sending a command to the industrial system with sensors 104 to alter the operation of the industrial machine.

3. Example Computer Components

Figure 2:
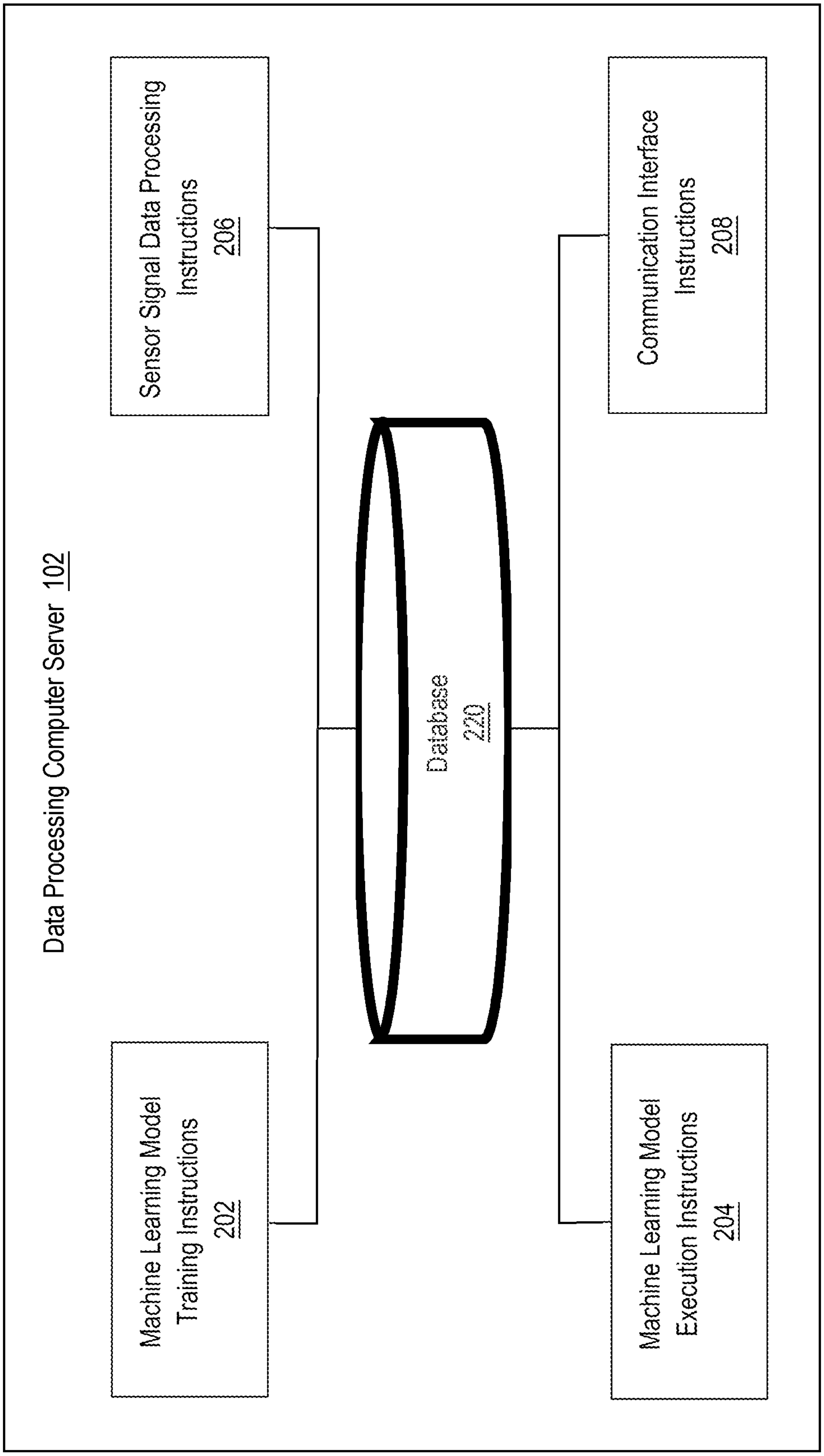
FIG. 2 illustrates example components of a data processing computer server in accordance with the disclosed embodiments.

FIG. 2 illustrates example components of a data processing computer server in accordance with the disclosed embodiments. The figure is for illustration purposes only and the server 102 can comprise fewer or more functional or storage components. Each of the functional components can be implemented as software components, general or specific-purpose hardware components, firmware components, or any combination thereof. Each of the functional components can also be coupled with one or more storage components. A storage component can be implemented using any of relational databases, object databases, flat file systems, or Javascript Object Notation (JSON) stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises machine learning model training instructions 202, machine learning model execution instructions 204, sensor signal data processing instructions 206, and communication interface instructions 208. The server 102 also comprises a database 220.

In some embodiments, the machine learning model training instructions 202 enable training a machine learning model for detecting anomalies in the operation of an industrial machine on given sensor signal data in the form of embeddings. The machine learning model assesses the relationship between each selected sensor signal and the other sensor signals in normal conditions of the industrial machine and specifically "predict" or reproduce the sensor signal data for the selected sensor signal given the sensor signal data for the other sensor signals. The training processes with different sensor signals as selected sensor signals can be carried out in parallel. The training comprises establishing an expected range for the "difference" between the predicted (or recreated) sensor signal data for the selected sensor signal and the actual sensor signal data for the selected sensor signal, as further discussed below.

In some embodiments, the machine learning model execution instructions 204 enable executing the machine learning model on new sensor signal data in the form of embeddings, where different processes with different sensor signals as selected sensor signals can be carried out in parallel. The executing comprises comparing the difference between the predicted sensor signal data for the selected sensor signal and the actual sensor signal data for the selected sensor signal with the associated expected range and taking corrective actions when the difference deviates from the expected range indicating the occurrence of a potential anomalous condition of the industrial machine. The corrective actions can include sending a notification of the deviation with instructions on how to handle the anomalous condition or sending a control signal to the industrial machine to directly affect the operation thereof.

In some embodiments, sensor signal data processing instructions 206 enable transforming raw time series data produced by sensors of the industrial machine to embeddings as a more concise representation. The transforming comprises generating, from the time series data, tiles at different resolutions or scales for different sensor signals having a common size for ease of transmission and processing. The transforming further comprises generating summaries of the data in tiles for improved computing efficiency in subsequent steps. The transforming further comprises generating, from the tiles, embeddings in latent space that are suitable for the machine learning model, as further discussed below.

In some embodiments, the communication interface instructions 208 enable communication with other systems or devices through computer networks. The communication can include receiving sensor signal data or processed sensor signal data as tiles or embeddings, receiving configuration data for training the machine learning model, transmitting the machine learning model, the output executing the machine learning model, or an analysis of the output.

In some embodiments, the database 220 is programmed or configured to manage storage of and access to relevant data, such as configuration data for training the machine learning model, sensor signal data as raw time series or embeddings, the machine learning model as a set of computer-executable instructions, output data of executing the machine learning model, an expected range of the difference between the predicted sensor signal data and the actual sensor signal data for different sensor signals, information regarding a deviation from an expected range for different sensor signals, alerts to occurrences of potential anomalous conditions of the industrial machine, or commands for controlling the operation of one or more components of the industrial machine.

4. Functional Descriptions

4.1. Data Collection and Representation

In some embodiments, the server 102 is programmed to receive sensor signal data as input data to a machine learning model. The machine learning model detects potential anomalies in the operation of an industrial machine or further classifies the current condition of the industrial machine. The sensor signal data can be raw time series data produced by sensors of the industrial machine that measure various attributes of the industrial machine, such as pressure, speed, or temperature. The raw time series data can be numerical or categorical. The server 102 can also be programmed to process the sensor signal data to generate tiles and store or transmit these tiles for each of a plurality of resolutions or scales. Each tile generally has a fixed number of cells. Each cell contains a fixed number of values over one or more time points. The fixed number of values can be aggregates of values of the attributes, such as mean, standard deviation, or a specific percentile, or a probability distribution, such as a histogram. For example, a probability distribution could be discretized into 32 buckets. A cell value being a discretized probability distribution readily applies to categorical values, although some buckets may be empty when the number of buckets is more than the number of categories.

In some embodiments, the tile size in terms of the number of cells is the same across all resolutions, while the cell coverage in terms of the number of time points would vary depending on the resolution. The tile size can be set to a value that enables efficient transfer of data one tile at a time, such as 10,000 cells, each cell having as many values as the number of aggregates or distribution buckets. Generally, a cell at a higher resolution would cover a larger number of time points. For example, the lowest resolution might correspond to the sampling rate such that each cell covers only one time point in 1 μs, and a higher resolution might correspond to rollups from a lower resolution. In other embodiments, the sensor signal data can be received in the form of tiles.

In some embodiments, the server 102 is programmed to further process the generated or received tiles to generate embeddings (or encodings) and store or transmit these embeddings. To enable efficient training of a machine learning model from the embeddings, as further discussed below, each tile can be divided into a number of slices, such as slices each having 64 cells. Each tile or a slice thereof in an original space can be transformed to an embedding in a latent space using a variational autoencoder (VAE) or other machine learning techniques. The number of values in a slice represents the number of dimensions of the original space, while the number of values in an embedding represents the number of dimensions of the latent space. Generally, the machine learning technique learns an embedding that ignores insignificant data or noise, leading to a latent space having a smaller number of dimensions than the original space. For example, in converting a slice that contains 64 cells each having 32 bucket values into an embedding vector of 32 values, the number of dimensions of the original space would be 64 by 32, while the number of dimensions of the latent space would be 32. For each sensor signal, the machine learning technique can apply to slices at the same resolution corresponding to different time periods to obtain embeddings for one resolution at a time. The machine learning technique can also apply to slices at different resolutions to obtain embeddings for multiple resolutions at a time. For example, starting from a unit time period for a cell at a particular resolution, the set of slices at that resolution and every higher resolution covering the same time period can be used to compute one embedding. In other embodiments, the sensor signal data can be received in the form of embeddings. Further information regarding the generation of embeddings from raw time series data can be found in co-pending U.S. application Ser. No. 17/493,800.

In some embodiments, the server 102 is programmed to use the embeddings as input data to the machine learning model that detects potential anomalies in the operation of the industrial machine. Each sample in the input data would correspond to multiple sensor signals during the same time period. When the sample is in the form of a feature vector, different features would respectively correspond to different sensor signals for the same time period to represent the condition of the industrial machine at that time period. Each feature can then comprise one or more embeddings at one or more resolutions. For example, all features can comprise embeddings that correspond to the second lowest resolution, or each feature could comprise a combination or aggregation of embeddings at all resolutions, forming a multiscale feature. The sample could also simply be in the form of a series of embeddings.

4.2. Machine Learning Model

Figure 3:
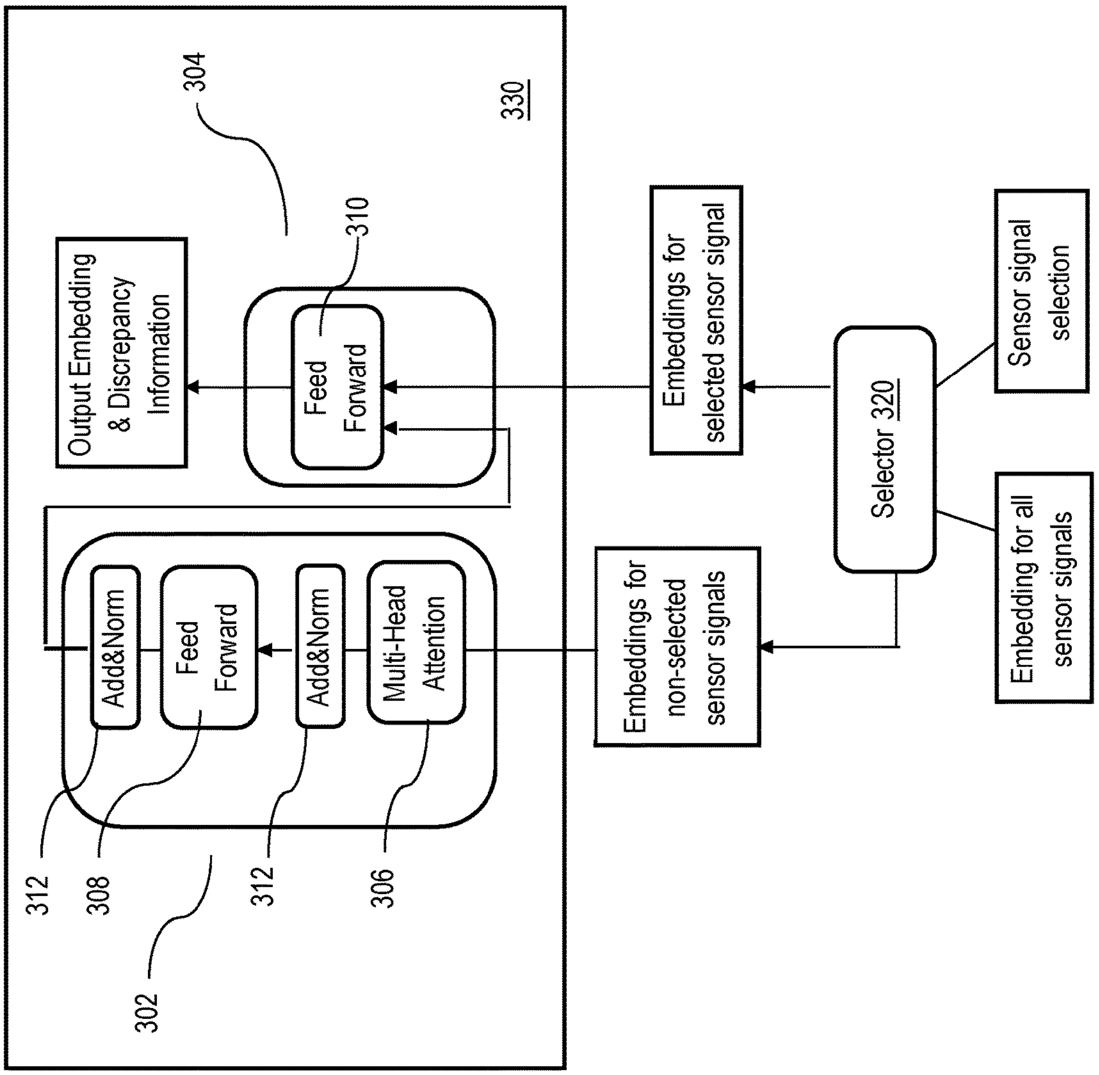
FIG. 3 illustrates an example transformer with a selector according to some embodiments described herein.

In some embodiments, the server 102 is programmed to manage a machine learning model that detects potential anomalies in the operation of an industrial machine. This machine learning model can have a plurality of transformers, each with an encoder-decoder architecture. FIG. 3 illustrates an example transformer with a selector according to the embodiments described herein. A selector 320 can receive a selection of a sensor signal in addition to the set of embeddings for collections of one or more slices corresponding to all sensor signals under consideration. A transformer 330 can then be trained to predict (or recreate) the embedding for a collection of one or more slices corresponding to the selected sensor signal (embedding for the selected sensor signal) from the embeddings for collections of one or more slices corresponding to the non-selected sensor signals (embeddings for the non-selected sensor signals). A separate transformer could be included for predicting the embedding of each of the sensor signals, or multiple selected signals could be encoded into a single transformer. Each transformer can produce not only a predicted embedding for the selected sensor signal but also discrepancy information indicating the deviation from the true embedding for the selected sensor signal.

In some embodiments, the transformer 330 comprises one or more encoders 302 and one decoder 304. The one or more encoders 302 encode the embeddings for the non-selected sensor signals during the same time interval or period. The one or more encoders 302 can be similar to those used in the Bidirectional Encoder Representation from Transformers (BERT) language representation model, where each encoder includes a first sub-layer having a multi-head self-attention mechanism 306, and a second sub-layer having a simple, position-wise, fully connected feed-forward network 308. A residual connection around each of the two sub-layers can be employed, followed by layer normalization. The one or more encoders 302 can also be similar to those used in any known variant of the BERT model (e.g., ALBERT, RoBERTa, ELECTRA) or any conceivable variant with known replacements of at least the attention mechanism 306 or the feed-forward network 308. Example values for the parameter L denoting the number of layers and the parameter A for the number of self-attention heads used in the BERT model and other variants can be used for the one or more encoders 302. Example values for the parameter H denoting the hidden size that are an order of magnitude smaller than those used in the BERT model and other variants can be used for the one or more encoders 302.

While the embeddings for different sensor signals might be received in a sequence by the transformer 330, the attention mechanism uses context from both sides of the current embedding, making the one or more encoders bidirectional. The attention mechanism 306 helps differentially weight the significance of each part of the input data, where a part in this case can be an embedding for a non-selected sensor signal in a particular time interval or a portion thereof. For example, the pressure sensor signal as the selected sensor signal might be more related to the temperature sensor signal and the volume sensor signal, and the machine learning model can learn to weight the embeddings corresponding to the temperature sensor signal and the volume sensor signal more heavily in predicting the embedding for the pressure sensor signal.

Self-attention could be restricted to considering only a neighborhood of a limited size in the input sequence, leading to a reduced computational complexity from considering the full input sequence and potential parallelism in processing the input sequence. The parallelism can be implemented by multiple attention heads. Specifically, the multi-head self-attention mechanism 306 obtains different representations of the key parameters, computes scaled dot-product attention for each representation, concatenates the results, and projects the concatenation through the feed-forward network 308. Therefore, the feed-forward network 308 transforms the input embeddings into a further embedding in a hidden state. The multi-head self-attention can be helpful especially when the number of sensor signals is large. The residual connections along the multi-head self-attention mechanism 306 and the feed-forward network 308 allow for non-encoded versions of the signal to be passed without encoding. The Add&Norm modules 312 can prevent exploding tensor values.

In some embodiments, the decoder 304 predicts the embedding for the selected sensor signal in the corresponding time period. The decoder 304 can comprise a single sub-layer having a simple, position-wise, fully connected feed-forward network 310 that transforms an embedding in a hidden state generated by the one or more encoders 302 back into an output embedding. Alternatively, the decoder 304 can include one or more convolutional layers. The decoder 304 can produce not only the output embedding but also discrepancy information representing the difference between the output embedding and the original embedding for the selected sensor signal.

4.3. Sensor Signal Selection

In some embodiments, the server 102 is programmed to select one sensor signal from the plurality of sensor signals in a given time interval. As each transformer is set up to capture one or more relationships between a sensor signal and the rest of the sensor signals in a group of signals, the server 102 can be programmed to send a unique selection of a sensor signal to each selector, and the transformers could be trained or executed separately and simultaneously. For example, the selection can be in the form of a bitmask, where the number of bits corresponds to the number of sensor signals under consideration. All transformers can have the same structure, but they can be trained on different sets of data to predict embeddings respectively for different groups of sensor signals.

4.4. Model Training

In some embodiments, the server 102 is programmed to train the machine learning model. The server 102 can work with a training database of embeddings, each a collection of one or more slices corresponding to a sensor signal in a time period. The training database would contain sufficient embeddings for each condition of one or more conditions of the industrial machine. When the machine learning model is used to detect the occurrence of anomalous conditions of the industrial machine, only embeddings corresponding to non-anomalous conditions of the industrial machine need to be present in the training database. A normal condition can represent all such non-anomalous conditions in this context or may describe a specific non-anomalous activity of the industrial machine in another context. As noted above, the input data to the machine learning model would include a plurality of embeddings respectively corresponding to a plurality of sensor signals in the same time interval, and each embedding of the plurality of embeddings could be for a slice at a particular resolution or multiple slices at all resolutions. The input data does not include any positional data as the relation of an embedding to sensor signal is fixed.

In some embodiments, the server 102 is programmed to train the machine learning model with the training database using any technique known to someone skilled in the art, such as back propagation. For each input set, the embeddings corresponding to the non-selected sensor signals are used to train the transformer to predict the embedding corresponding to the selected sensor signal. The server 102 can be programmed to use binary cross entropy as the loss function for back propagation to measure the difference between the predicted output and the expected output, namely the predicted embedding for the selected sensor signal and the actual embedding for the selected sensor signal. The larger the function value, the lower the correlation and thus the worse the prediction. Other loss functions can be used, such as root mean square error (RMSE) or the Kullback-Leibler divergence.

In some embodiments, the server 102 is programmed to manage the loss values generated by the loss function in training the machine learning model. For each transformer, the server 102 is programmed to record the loss values and determine an expected range for the loss value when the industrial machine operates in a normal condition or any other specified condition. The server 102 can be programmed to select the expected range to be the mean plus or minus two standard deviations from the distribution of loss values for the normal condition, the center twenty percentile, or according to another measure. The server 102 can also be programmed to select the expected range to avoid significant overlap with the distribution of loss values for known anomalous conditions or any other non-normal conditions. For example, the expected range can be limited to be outside the same range of mean plus or minus two standard deviations for any anomalous condition. Over all the trained transformers, each corresponding to a unique sensor signal as the selected sensor signal, a plurality of expected ranges would be available for a given condition of the industrial machine. In other embodiments, the server 102 can be programmed to determine the expected range for an aggregate of the loss values over all sensor signals as selected signals. For example, the expected range for the sum of the binary cross entropy values over all transformers can be computed.

In some embodiments, the server 102 is programmed to consider the loss value for multiple sensor signals against the other sensor signals. The multiple sensor signals instead of a single sensor signal would be selected initially, and a transformer can be trained to predict the embeddings for the multiple sensor signals instead of a single sensor signal. For example, it may be known that the attributes of the industrial machine often operate in pairs, then two sensor signals could be selected at a time.

In some embodiments, the server 102 is programmed to train different transformers in parallel. Such parallelism can be implemented via one or more GPUs, for example, to increase the throughput and reduce the training time. When a new sensor signal is added, a new transformer can be added, and the machine learning model can be retrained with roughly the same amount of time given the parallelism. Alternatively, when the relationships among all sensor signals are encoded in one transformer, the machine learning model can be directly retrained.

4.5. Model Execution

In some embodiments, as the industrial machine continues to be in operation, the sensors continue generating sensor signal values. In continuously receiving the sensor signal values, the server 102 can be programmed to maintain a sliding time window and process the sensor signal data in the time window in real time to assess the current condition of the industrial machine. Specifically, the server 102 can be programmed to execute the machine learning model on new sensor signal data in a given particular time interval defined by the sliding time window to determine whether the industrial machine falls into a particular condition at the given time interval. Two consecutive positions of the sliding window could overlap for a predetermined amount or could be apart for another predetermined amount. In certain embodiments, the server 102 can be programmed to execute different transformers in parallel. Such parallelism can similarly be implemented via one or more GPUs, for example, to increase the throughput and reduce the execution time.

In some embodiments, the server 102 can be programmed to determine, for a given time interval and for each sensor signal against the other sensor signals, whether the loss value computed by the corresponding transformer falls within the associated expected range for a normal condition of the industrial machine. If not, the relationship between the sensor signal and the rest of the sensor signals has changed, which indicates an occurrence of an anomalous condition of the industrial machine. Similarly, the loss value falling within the associated expected range for a specific non-normal condition also indicates an occurrence of an anomalous condition of the industrial machine. In response to such an indication, the server 102 can be programmed to raise an alert. The alert may specify the time interval, the sensor signal, or the amount of deviation from the expected range. The alert may also include additional information, such as the values of one or more of the sensor signals during the time interval, the predicted or expected values of one or more sensor signals during the time interval, during time periods right before the time interval, or over a historical period. The alert can be sent to a computing or display device.

In some embodiments, the server 102 is programmed to further consider the loss values from the sensor signal data in a given time interval in combination. An anomaly in the operation of the industrial machine may affect one or more attributes of the industrial machine. When the anomaly affects one attribute, one or more loss values may fall outside the associated expected ranges, although conceivably the loss value for the sensor signal corresponding to the affected attribute against the other sensor signals may deviate from the associated expected range most significantly. Similarly, when the anomaly affects multiple attributes, conceivably the loss values for the sensor signals corresponding to the affected attributes against the other sensor signals may deviate from the associated expected range most significantly. Therefore, the relative amount of deviation for a sensor signal may provide additional information regarding an anomaly, such as the cause of the anomaly.

In some embodiments, the server 102 is programmed to evaluate an amount of deviation from the expected range for multiple sensor signals as the selected signals against the other sensor signals, or an amount of deviation from the expected range for an aggregate over all sensor signals as selected signals, as discussed above. The server 102 can be programmed to similarly raise an alert for the potential anomaly in response to such a deviation. The server 102 can be programmed to further evaluate a relative amount of deviation from the expected range for a sensor signal as the selected signal against the other sensor signals and further suggest the cause for the anomaly accordingly, also as discussed above.

In some embodiments, the server 102 is programmed to perform remedial steps in response to detecting a potential anomaly in the operation of the industrial machine. The server 102 can follow a predetermined mapping between sensor signals and corrective actions such that when the loss value for a particular sensor signal against the other sensor signals falls substantially outside the associated expected range or when the corresponding relative amount of deviation from the expected range is most significant, the corresponding corrective action is taken. The corrective action can be sending a control signal to a component of the industrial machine to change the operation of that component. For example, when the particular sensor measures the temperature of a particular component, the corrective action for an unexpected high temperature may be to slow down the feeding of specific material into the particular component or reducing the rotational speed of a particular component. The server 102 can also record additional corrective actions taken by an operator and learn to implement those corrective actions automatically over time.

5. Example Processes

Figure 4:
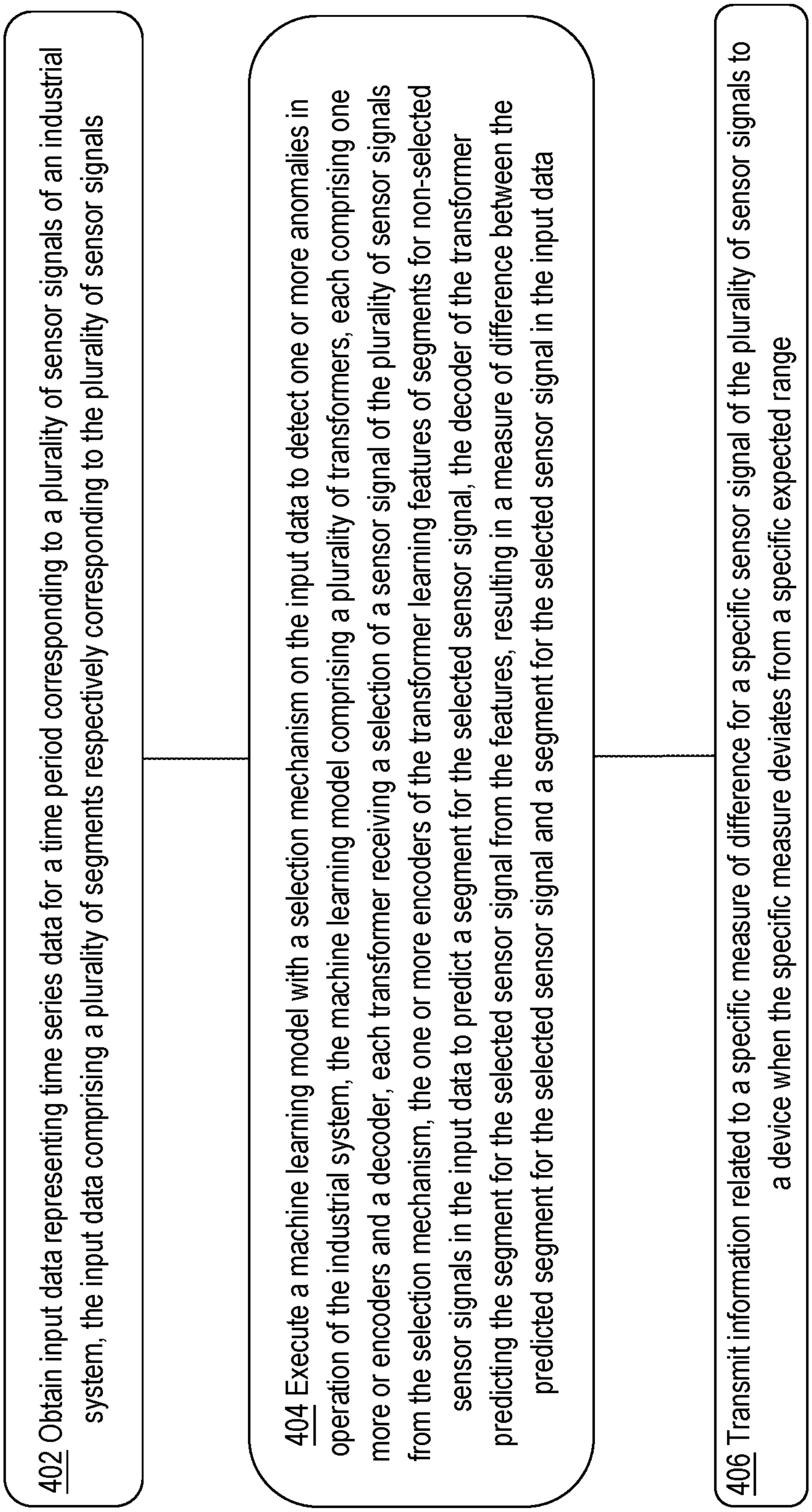
FIG. 4 illustrates an example process performed by the data processing computer server in accordance with some embodiments described herein.

FIG. 4 illustrates an example process performed by a data processing computer server in accordance with some embodiments described herein. FIG. 4 is shown in simplified, schematic format for purposes of illustrating a clear example and other embodiments may include more, fewer, or different elements connected in various manners. FIG. 4 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 402, the server 102 is configured to obtain input data representing time series data for a time period corresponding to a plurality of sensor signals of an industrial system. The input data comprises a plurality of segments respectively corresponding to the plurality of sensor signals.

In some embodiments, each segment of the plurality of segments corresponds to time series data aggregated at a plurality of scales. In other embodiments, each segment of the plurality of segments corresponds to a probability distribution of sensor signal values into a specific number of buckets.

In some embodiments, the server 102 is configured to continuously receive tiles of a fixed size, each tile representing time series data for a certain time period for a certain sensor signal. The server 102 is further configured to divide a tile into a plurality of slices and execute a variational autoencoder on one or more slices of the tiles, thereby generating an embedding in a latent space.

In step 404, the server 102 is configured to execute a machine learning model with a selection mechanism on the input data to detect one or more anomalies in operation of the industrial system. The machine learning model comprises a plurality of transformers, each comprising one or more encoders and a decoder. Each transformer receives a selection of a sensor signal of the plurality of sensor signals from the selection mechanism. The one or more encoders of the transformer learn features of segments for non-selected sensor signals in the input data to predict a segment for the selected sensor signal, while the decoder of the transformer predicts the segment for the selected sensor signal from the features, resulting in a measure of difference between the predicted segment for the selected sensor signal and a segment for the selected sensor signal in the input data.

In some embodiments, each encoder of the one or more encoders has a multi-headed self-attention layer and a feed-forward layer. In other embodiments, the selection mechanism makes a selection of each sensor signal of plurality of the sensor signals and sends different selections to different transformers of the plurality of transformers. In yet other embodiments, the measure of difference being a value for binary cross entropy.

In step 406, the server 102 is configured to transmit information related to a specific measure of difference for a specific sensor signal of the plurality of sensor signals to a device when the specific measure deviates from a specific expected range.

In some embodiments, the information indicates the time period, the specific measure of difference, the specific sensor signal, or an amount of deviation from the specific expected range. In other embodiments, the device is a processor coupled to the industrial system, and the information includes a command to control the operation of the industrial system to improve future values of the specific sensor signal.

In some embodiments, the server 102 is configured to aggregate the measures of difference over the plurality of transformers to obtain an aggregate measure. The server 102 is configured to then transmit further information related to the aggregate measure to the device when the aggregate measure deviates from a predetermined aggregate expected range.

In some embodiments, the server 102 is configured to train the machine learning model with a training dataset of samples. Each sample comprises a plurality of segments respectively corresponding to the plurality of sensor signals for a common time interval when the operation of industrial operation is considered normal. In training the machine learning model, the server can be configured to record the measure of difference for each sensor signal of the plurality of sensor signals and each sample in the training dataset, and determine an expected range for a sensor signal of the plurality of sensor signals based on aggregate values of the measures of difference across all samples in the training dataset.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
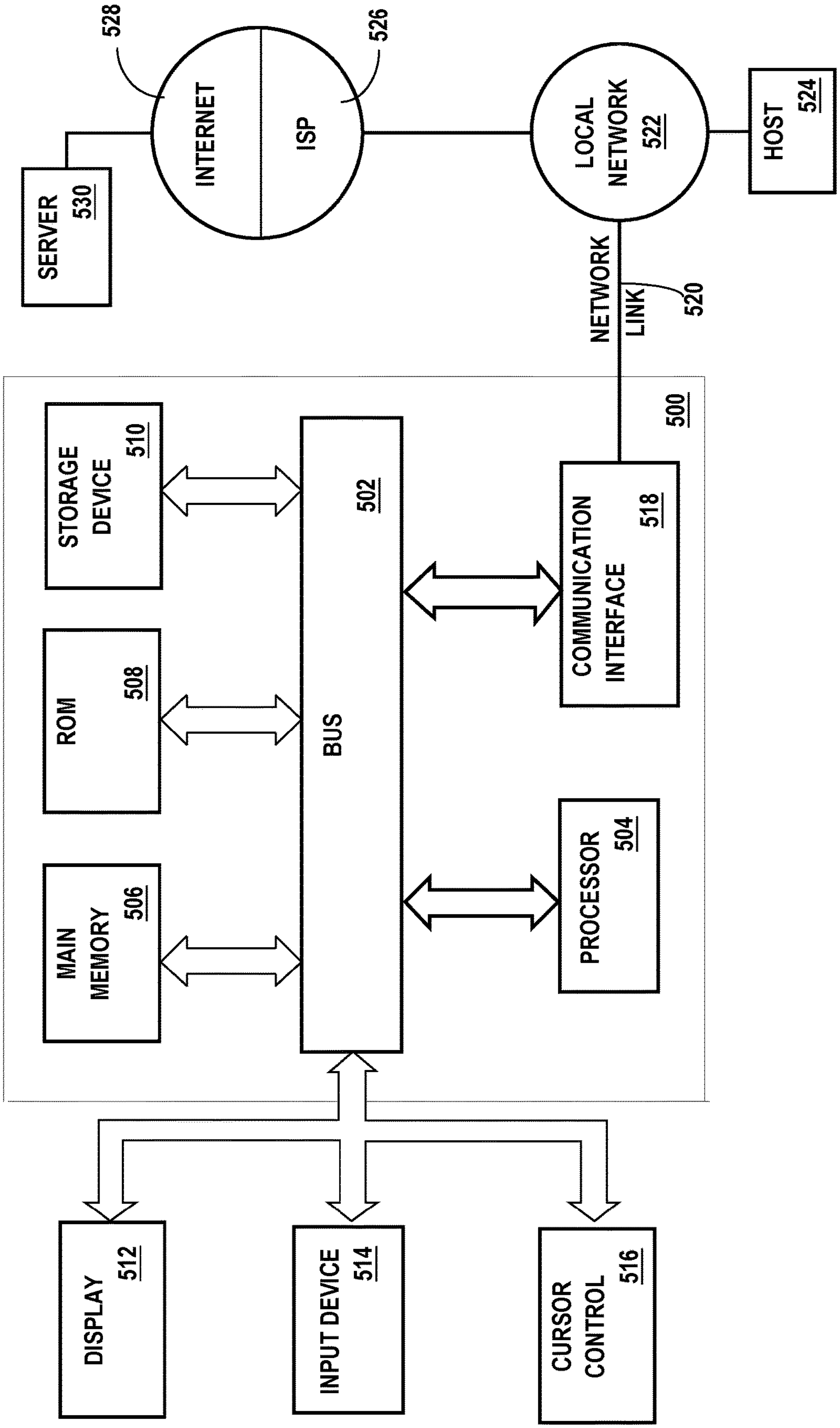
FIG. 5 is a block diagram that illustrates a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a GPU or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on the output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a LAN, WAN, campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or NoSQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A computer-implemented method of evaluating a condition of a physical system from values of sensors of the physical system, comprising:

training, by a processor, a machine learning model with a selection mechanism on training data to detect one or more anomalies in operation of the physical system, the training data including a plurality of training sets, each training set including a certain plurality of segments representing time series data for a respective time period, the certain plurality of segments corresponding to a plurality of sensor signals of the physical system in a normal condition, the machine learning model comprising one or more transformers, each comprising one or more encoders and a decoder, each transformer receiving a selection of a sensor signal of the plurality of sensor signals from the selection mechanism, the one or more encoders of the transformer learning features of first segments for non-selected sensor signals, the first segments being in a certain training set of the plurality of training sets for the respective time period, to predict a segment for the selected sensor signal for the respective time period, the decoder of the transformer predicting the segment for the selected sensor signal as a predicted segment from the features, resulting in a measure of difference between the predicted segment for the selected sensor signal and a second segment for the selected sensor signal, the second segment being in the certain training set for the respective time period;

executing, by the processor, the machine learning model on input data including a plurality of segments representing time series data for a specific time period and corresponding to the plurality of sensor signals to obtain a specific measure of difference for a specific sensor signal of the plurality of sensor signals;

transmitting information related to the specific measure of difference for the specific sensor signal to a device coupled to or included in the physical system when the specific measure of difference deviates from a specific expected range, thereby signaling an anomalous condition.

2. The computer-implemented method of claim 1, each segment of the plurality of segments corresponding to time series data aggregated at a plurality of scales.

3. The computer-implemented method of claim 1, each segment of the plurality of segments corresponding to a probability distribution of sensor signal values into a specific number of buckets.

4. The computer-implemented method of claim 1, the executing comprising:

continuously receiving tiles of a fixed size, each tile representing time series data for the specific time period for a particular sensor signal;

dividing a tile into a plurality of slices;

executing a variational autoencoder on one or more slices of the tiles, thereby generating an embedding in a latent space as a segment of the plurality of segments.

5. The computer-implemented method of claim 1, each encoder of the one or more encoders having a multi-headed self-attention layer and a feed-forward layer.

6. The computer-implemented method of claim 1, the selection mechanism making a selection of each sensor signal of the plurality of the sensor signals and sending different selections to different transformers of the one or more transformers.

7. The computer-implemented method of claim 1, further comprising:

aggregating the specific measures of difference over the one or more transformers to obtain an aggregate measure;

transmitting further information related to the aggregate measure to the device when the aggregate measure deviates from a predetermined aggregate expected range.

8. The computer-implemented method of claim 1, the information indicating the time period, the specific measure of difference, the specific sensor signal, or an amount of deviation from the specific expected range.

9. The computer-implemented method of claim 1, the device being a certain processor coupled to or included in the physical system, the information including a command to control the operation of the physical system to improve future values of the specific sensor signal.

10. The computer-implemented method of claim 1, the measure of difference being a value for binary cross entropy.

11. The computer-implemented method of claim 1, further comprising, in training the machine learning model:

recording the measure of difference for each sensor signal of the plurality of sensor signals and each training set in the training data;

determining an expected range for a sensor signal of the plurality of sensor signals based on aggregate values of the measures of difference across all training sets in the training data.

12. A computer-readable, non-transitory storage medium storing computer-executable instructions, which when executed implement a method of evaluating a condition of a physical system from values of sensors of the physical system, the method comprising:

training, by a processor, a machine learning model with a selection mechanism on training data to detect one or more anomalies in operation of the physical system, the training data including a plurality of training sets, each training set including a certain plurality of segments representing time series data for a respective time period, the certain plurality of segments corresponding to a plurality of sensor signals of the physical system in a normal condition, the machine learning model comprising one or more transformers, each comprising one or more encoders and a decoder, each transformer receiving a selection of a sensor signal of the plurality of sensor signals from the selection mechanism, the one or more encoders of the transformer learning features of first segments for non-selected sensor signals, the first segments being in a certain training set of the plurality of training sets for the respective time period, to predict a segment for the selected sensor signal for the respective time period, the decoder of the transformer predicting the segment for the selected sensor signal as a predicted segment from the features, resulting in a measure of difference between the predicted segment for the selected sensor signal and a second segment for the selected sensor signal, the second segment being in the certain training set for the respective time period;

executing, by the processor, the machine learning model on input data including a plurality of segments representing time series data for a specific time period and corresponding to the plurality of sensor signals to obtain a specific measure of difference for a specific sensor signal of the plurality of sensor signals;

transmitting information related to the specific measure of difference for the specific sensor signal to a device coupled to or included in the physical system when the specific measure of difference deviates from a specific expected range, thereby signaling an anomalous condition.

13. The computer-readable, non-transitory storage medium of claim 12, each segment of the plurality of segments corresponding to time series data aggregated at a plurality of scales.

14. The computer-readable, non-transitory storage medium of claim 12, each segment of the plurality of segments corresponding to a probability distribution of sensor signal values into a specific number of buckets.

15. The computer-readable, non-transitory storage medium of claim 12, the executing comprising:

continuously receiving tiles of a fixed size, each tile representing time series data for the specific time period for a particular sensor signal;

dividing a tile into a plurality of slices;

executing a variational autoencoder on one or more slices of the tiles, thereby generating an embedding in a latent space as a segment of the plurality of segments.

16. The computer-readable, non-transitory storage medium of claim 12, each encoder of the one or more encoders having a multi-headed self-attention layer and a feed-forward layer.

17. The computer-readable, non-transitory storage medium of claim 12, the selection mechanism making a selection of each sensor signal of the plurality of the sensor signals and sending different selections to different transformers of the one or more transformers.

18. The computer-readable, non-transitory storage medium of claim 12, the device being a certain processor coupled to or included in the physical system, the information including a command to control the operation of the physical system to improve future values of the specific sensor signal.

19. The computer-readable, non-transitory storage medium of claim 12, the method further comprising, in training the machine learning model:

recording the measure of difference for each sensor signal of the plurality of sensor signals and each training set in the training data;

determining an expected range for a sensor signal of the plurality of sensor signals based on aggregate values of the measures of difference across all training sets in the training data.

* * * * *